United States Patent [19]
Rautiola

[11] Patent Number: 5,437,056
[45] Date of Patent: Jul. 25, 1995

[54] METHOD FOR DYNAMICALLY ALLOCATING RADIO CHANNELS AMONG FIXED RADIO STATIONS OF A RADIO SYSTEM IN CASE OF TRANSMISSION LINE FAILURE BETWEEN A FIXED STATION AND A CONTROL CENTER OF THE RADIO SYSTEM

[75] Inventor: Markku Rautiola, Tampere, Finland

[73] Assignee: Nokia Telecommunications Oy, Espoo, Finland

[21] Appl. No.: 70,312

[22] PCT Filed: Sep. 24, 1992

[86] PCT No.: PCT/FI92/00254
§ 371 Date: Jun. 3, 1993
§ 102(e) Date: Jun. 3, 1993

[87] PCT Pub. No.: WO93/07725
PCT Pub. Date: Apr. 15, 1993

[30] Foreign Application Priority Data
Oct. 3, 1991 [FI] Finland ................................. 914654

[51] Int. Cl.[6] .............................................. H04Q 7/00
[52] U.S. Cl. ................... 455/34.1; 455/56.1; 455/67.1
[58] Field of Search ................... 455/33.1, 33.2, 54.1, 455/53.1, 56.1, 67.1, 67.5, 34.1; 379/59, 60

[56] References Cited
U.S. PATENT DOCUMENTS

| | | | |
|---|---|---|---|
| 4,686,671 | 8/1987 | Burian et al. | 455/56.1 |
| 5,117,501 | 5/1992 | Childress et al. | 455/56.1 X |
| 5,239,682 | 8/1993 | Strawcynski et al. | 455/54.1 |
| 5,241,686 | 8/1993 | Charbonnier | 455/33.2 |

FOREIGN PATENT DOCUMENTS
359535 3/1990 European Pat. Off. .

Primary Examiner—Edward F. Urban
Attorney, Agent, or Firm—Cushman Darby & Cushman

[57] ABSTRACT

The invention relates to a radio channel allocation method for a radio system in which a mobile exchange (MX) dynamically allocates radio channels to the base stations (BS1, BS2, BS3) from a predetermined pool of radio channels on a call-by-call basis. In the method according to the invention, when any of the fixed stations (BS1, BS2, BS3) detects a line failure in the transmission line between the fixed station and the control centre (MX), the fixed station starts to use only specific fallback radio channels assigned to it in advance from said pool of radio channels; and when the control centre (MX) detects a line failure in the transmission line between the control centre and any of the fixed stations (BS1, BS2, BS3), the control centre removes specific fallback radio channels assigned in advance to the particular fixed station from the pool of radio channels available to the neighbouring fixed stations of the particular fixed station. (FIG.1)

2 Claims, 2 Drawing Sheets

---

Assigning specific fallback channels of a predetermined pool of radio channels to the fixed radio stations of a radio system in which radio channels are usually dynamically allocated by a control center from the pool to respective fixed radio stations independently for each call Upon detecting at a fixed radio station a line failure in the transmission line between that fixed radio station and the control center, using only respective fallback channels for calls from that fixed radio station Upon detecting at the control center, a line failure in the transmission line between the control center and one of the fixed radio stations, removing respective fallback channels possible to be used for calls from that fixed radio station from said pool so as to prevent their being used by neighboring ones of the fixed radio stations Upon detecting re-establishment of the failed line, the control center adding the removed fallback channels back to the pool

| Assigning specific fallback channels of a predetermined pool of radio channels to the fixed radio stations of a radio system in which radio channels are usually dynamically allocated by a control center from the pool to respective fixed radio stations independently for each call |

| Upon detecting at a fixed radio station a line failure in the transmission line between that fixed radio station and the control center, using only respective fallback channels for calls from that fixed radio station |

| Upon detecting at the control center, a line failure in the transmission line between the control center and one of the fixed radio stations, removing respective fallback channels possible to be used for calls from that fixed radio station from said pool so as to prevent their being used by neighboring ones of the fixed radio stations |

| Upon detecting re-establishment of the failed line, the control center adding the removed fallback channels back to the pool |

FIGURE 3

METHOD FOR DYNAMICALLY ALLOCATING RADIO CHANNELS AMONG FIXED RADIO STATIONS OF A RADIO SYSTEM IN CASE OF TRANSMISSION LINE FAILURE BETWEEN A FIXED STATION AND A CONTROL CENTER OF THE RADIO SYSTEM

FIELD OF THE INVENTION

The invention relates to a radio channel allocation method for a radio system comprising several fixed radio stations located apart from each other in a geographical area covered by the radio system, remote radio stations, and a control center for dynamically allocating radio channels to the fixed radio stations from a predetermined pool of radio channels independently for each call.

BACKGROUND OF THE INVENTION

In a multiple access type mobile radio system, a large number of subscribers share the same group or pool of radio channels. In the call setup, the system checks the user authorization of an individual subscriber and allocates radio channel resources to the subscriber by automatically selecting a free radio channel from the pool. Dynamic allocation or control of the radio channels aims at increasing the efficiency of the utilization of radio channels within areas where the traffic intensity is relatively low, where there occurs coverage problems or where the traffic moves from one area to another at different times of the day, for instance. The mobile exchange thereby allocates radio channels to the base stations within its area on the basis of the call requests so that the same frequencies are not used simultaneously at adjacent base stations which might interfere with each other.

In the fallback state of the base station, there is a line failure in the transmission line between the base station and the mobile exchange. In the fallback state, the base station is not, however, controlled by the associated mobile exchange, but the base station configuration is usually such that the base station is able to switch calls between the mobile radios located within its radio coverage area. As a result, it may independently use the same radio channels which the mobile exchange has at the same time allocated to an adjacent base station. Such simultaneous calls or the same radio channels interfere with each other.

In one prior art arrangement, to solve this problem, base stations in the fallback state use special fallback radio channels which the system does not use in normal operation. This, however, requires more channels in the system and is uneconomical in terms of the utilization of the channels.

SUMMARY OF THE INVENTION

The object of the invention is to provide a method which avoids the above-mentioned problems and disadvantages.

This is achieved by means of a radio channel allocation method, which according to the invention is characterized in that when any of the fixed stations detects a line failure in the transmission line between the fixed station and the control center, the fixed station starts to use only specific fallback radio channels assigned to it in advance from the pool of radio channels; and when the control center detects a line failure in the transmission line between the control center and any of the fixed stations, the control center removes specific fallback radio channels assigned in advance to the particular fixed station from the pool of radio channels available to the neighboring fixed stations of the particular fixed station.

According to the invention, a fixed radio station, i.e. a base station, does not disturb the rest of the radio system when it operates independently. Further according to the invention, the same radio channels can be used both in normal operation and in fallback state. Accordingly, the utilization ratio of the radio channels is higher and the remote radio stations need not register separately at a base station which is in the fallback state, which improves the efficiency of the fallback operation.

BRIEF DESCRIPTION OF THE DRAWINGS

In the following the invention will be described in greater detail by means of illustrating embodiments with reference to the attached drawings, in which:

FIG. 3 is a flow chart of the preferred embodiment of the process.

DETAILED DESCRIPTION

Figure 1:
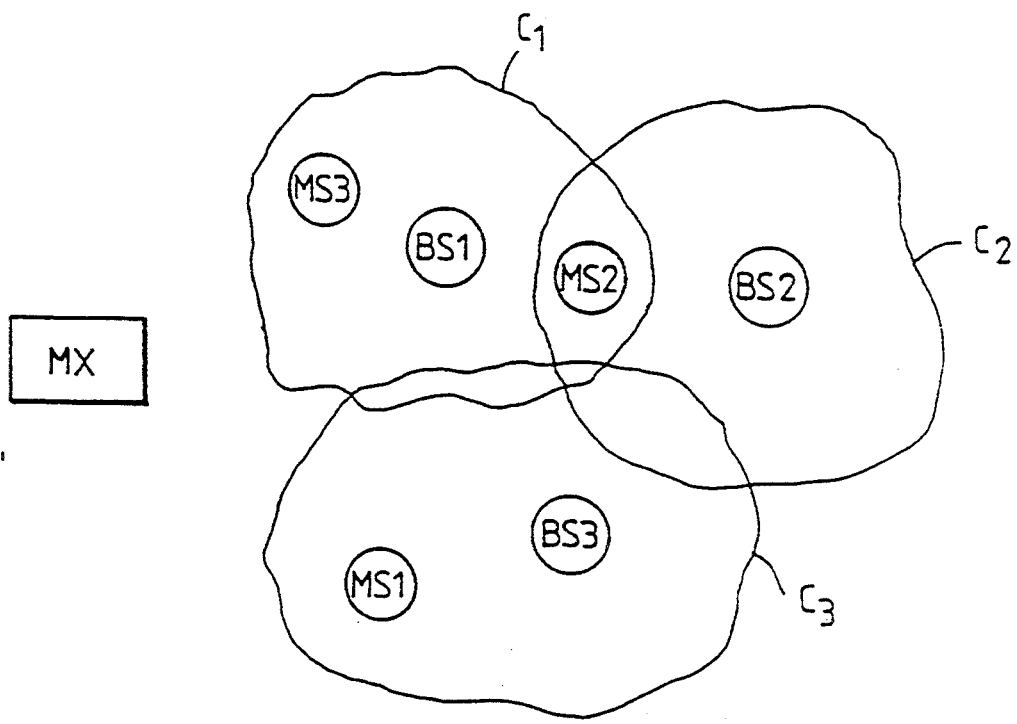
FIG. 1 illustrates a radio system in which the invention is applicable.

In the multiple access type (cellular or trunk) mobile radio system shown in FIG. 1, the geographical area covered by the system is divided into smaller radio areas, i.e. radio cells C1, C2 and C3 so that adjacent cells adjoin or preferably overlap. Each cell C1, C2 and C3 comprises at least one fixed multi-channel transceiver equipment BS1, BS2 and BS3 referred to herein as base stations. All the base stations BS1, BS2 and BS3 are connected fixedly by means of e.g. cables to a mobile exchange MX, which thus controls several base stations BS.

Predetermined radio frequencies, i.e. radio channels are assigned to the radio system for speech or data radio connections. The base stations BS establish radio connections over the radio channels to the remote radio stations or mobile radio stations MS moving within the cells. The mobile exchange MX allocates these radio channels to the base stations separately for each call (on call-by-call basis) on a so-called dynamic allocation principle so that the same frequencies are not used simultaneously at adjacent base stations which might interfere with each other.

Figure 2:
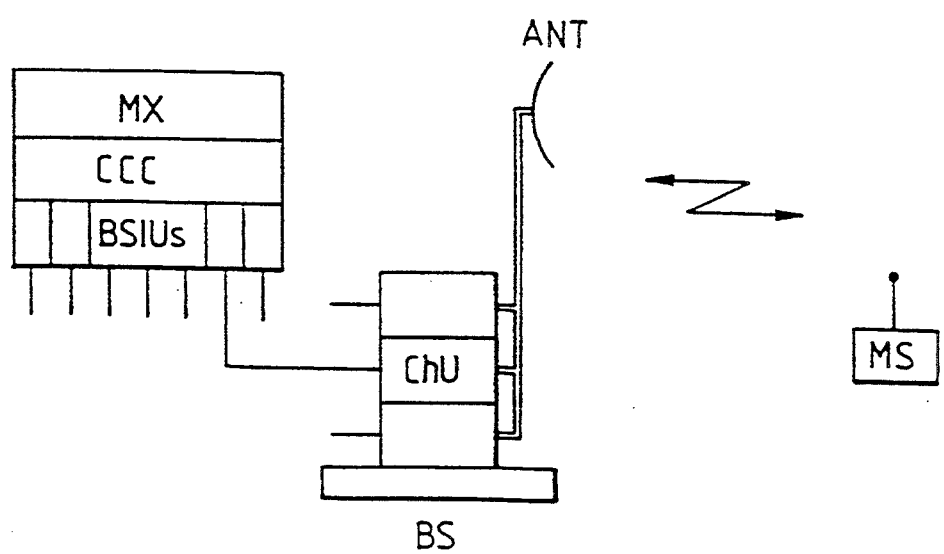
FIG. 2 illustrates a switching arrangement between a mobile exchange and a base station.

FIG. 2 illustrates the transmission line arrangement between the mobile exchange MX and the base station BS. The mobile exchange MX contains base station interface units BSIU each operating as a link between a call control computer CCC and a base station radio channel unit ChU. Each base station BS has several radio channel units ChU each comprising a radio transceiver. For each call the mobile exchange MX may command the channel unit ChU to operate on a predetermined desired radio channel for performing the above-mentioned dynamic allocation.

The interface unit BSIU has four primary functions: to control access to the radio channel; to transform and forward messages between the radio units, i.e. channel units ChU, and the call control computer CCC; to switch the speech paths of the exchange MX to the radio channel; and to control and monitor the operation of the base station BS. One BSIU controls one channel, which may be either a traffic channel or a control channel (call channel) which the system uses for control signalling, such as call setup signalling. In the control channel mode, the BSIU may operate as a dedicated control channel, an undedicated control channel or a time-shared control channel. FI Patent Application 905994 describes a system in which several base stations BS1, BS2 and BS3 have a common frequency channel as a control channel, and the base stations BS1, BS2 and BS3 use the frequency channel on a time-sharing basis sequentially for the transmission of their control messages.

The BSIU may operate in a control or traffic mode. In both modes of operation, it receives messages from the call control computer CCC, supervises a 4-wire speech and signalling connection between the exchange MX and the base station BS, and transmits supervision data concerning the states of the transmitter, the base station and the transmission lines to the call control computer CCC.

When the BSIU is connected to the traffic channel, it is either in an idle state or speech state. In the idle state the BSIU waits for a reservation message from the call control computer CCC, and monitors the transmission line to the base station BS. When the BSIU is reserved for a call, it starts the transmitter of the base station BS and switches on the speech paths between the base station BS and the exchange MX in accordance with the type of the call. During the call the BSIU transmits and receives call control messages and monitors the maintenance and releases the call according to the carrier wave data, call control messages from the radio path and control signals from the call control computer CCC.

The call control computer CCC of the mobile exchange MX allocates free radio channels, radio channel units ChU and base station interface units BSIU to each call in which one or more remote mobile stations MS controlled by the exchange MX participate.

If all the interface units BSIU and/or channel units ChU (radio channels) of a base station required for a particular call are reserved, the system instructs the call to wait until the required radio channel resources are released.

If there is a line failure in the transmission line between a particular base station BS and the mobile exchange MX, the mobile exchange MX is no longer able to control the operation of the base station BS. This is referred to as a fallback state of the base station BS. Each base station BS, however, is configured such that it is able to independently switch calls and set up connections locally between remote stations MS located within its own cell C.

According to the invention, specific radio channels are assigned to each base station BS from among the normally used radio channels (from the radio channel pool) for possible fallback operation. The call control computer CCC of the mobile exchange MX informs the base station BS about these fallback channels whenever the radio channel units of the base station BS are initialized. The base station BS stores the fallback radio channel data in the memory. When the base station detects that there is a failure in the transmission line between the base station and the mobile exchange MX, the base station BS starts to use merely these fallback channels. Correspondingly, when the call control computer CCC detects that there is a line failure in a transmission line to a base station BS, it removes the fallback radio channels assigned to the particular base station from the radio channel pool of adjacent base stations. As a consequence, these radio channels will still be allocated to the remote base stations, and the operation of the base station in fallback state does not interfere with the rest of the radio system. When the fallback state ends (the transmission line between the base station BS and the mobile exchange MX is re-established), the mobile exchange releases the fallback radio channels and returns them to the radio channel pools of the adjacent base stations for normal use.

The attached figures and the description related to them are only intended to illustrate the present invention. In its details the method according to the invention may vary within the scope of the attached claims.

I claim:

1. A radio channel allocation method for a radio system comprising several fixed radio stations located apart from each other in a geographical area covered by the radio system, remote radio stations, and a control center for dynamically allocating radio channels to the fixed radio stations from a predetermined pool of radio channels independently for each call, said method comprising:

assigning specific fallback channels of said predetermined pool of radio channels to each fixed radio station;

dynamically allocating radio channels to the fixed radio stations from said predetermined pool of radio channels independently for each call;

detecting at one of the fixed stations a line failure in the transmission line between the fixed station and the control center;

allocating, in response to said detecting of line failure, at said one of the fixed stations only said specific fallback radio channels assigned to said one of the fixed stations in advance from said pool of radio channels;

detecting at the control center a line failure in the transmission line between the control center and said one of the fixed stations; and removing, in response to said line failure, said specific fallback radio channels assigned at the control center in advance to said one of the fixed stations from said pool of radio channels.

2. The method according to claim 1, further comprising:

making said removed radio channels available to all fixed radio stations at said control center responsive to a re-establishment of the transmission line between the control center and said one of the fixed radio stations.

* * * * *